United States Patent
Trachtenberg (10) Patent No.: US 10,586,512 B2
(45) Date of Patent: Mar. 10, 2020

(54) ORCHESTRATED DIGITAL DISPLAY SYSTEM

(71) Applicant: Marc Trachtenberg, New York, NY (US)

(72) Inventor: Marc Trachtenberg, New York, NY (US)

(73) Assignee: Videri Inc., New York, NY (US)

( * ) Notice: Subject to any disclaimer, the term of this patent is extended or adjusted under 35 U.S.C. 154(b) by 0 days.

(21) Appl. No.: 15/821,199

(22) Filed: Nov. 22, 2017

(65) Prior Publication Data

US 2018/0144720 A1   May 24, 2018

Related U.S. Application Data (60) Provisional application No. 62/425,940, filed on Nov. 23, 2016.

(51) Int. Cl.
G09G 5/12 (2006.01)
G06F 3/14 (2006.01)

(52) U.S. Cl.
CPC ............. G09G 5/12 (2013.01); G06F 3/1446 (2013.01); G09G 2354/00 (2013.01); G09G 2356/00 (2013.01); G09G 2370/022 (2013.01); G09G 2370/06 (2013.01); G09G 2370/16 (2013.01)

(58) Field of Classification Search
CPC .. G09G 5/12; G09G 2370/06; G09G 2356/00; G09G 2354/00; G09G 2370/022; G06F 3/1446
See application file for complete search history.

(56) References Cited

U.S. PATENT DOCUMENTS

| | | | |
|---|---|---|---|
| 2012/0075334 A1 | 3/2012 | Pourbigharaz et al. | |
| 2012/0206319 A1* | 8/2012 | Lucero | H04N 21/4788 345/1.3 |
| 2013/0265487 A1 | 10/2013 | Yu et al. | |
| 2015/0382388 A1 | 12/2015 | Legallais et al. | |
| 2016/0011843 A1 | 1/2016 | Buchner | |
| 2016/0133226 A1* | 5/2016 | Park | G06F 3/01 345/156 |
| 2017/0201740 A1 | 7/2017 | Gordon | |

OTHER PUBLICATIONS

Written Opinion of the International Searching Authority in PCT/US2017/063068 (dated Mar. 5, 2018).
International Search Report in PCT/US2017/063068 (dated Mar. 5, 2018).

* cited by examiner

*Primary Examiner* — Aneeta Yodichkas
(74) *Attorney, Agent, or Firm* — Pryor Cashman LLP

(57) ABSTRACT

A system for orchestrating multiple digital display devices to display a digital content item across the multiple digital display devices, including multiple digital display devices, where each digital display device includes a display screen, a memory, a processor, and data link capabilities, a user device including a display screen, a user interface, a memory, a processor, and data link capabilities, and a cloud-based computing system configured to communicate with the multiple digital display devices and the user device.

26 Claims, 9 Drawing Sheets

ORCHESTRATED DIGITAL DISPLAY SYSTEM

CROSS-REFERENCE TO RELATED APPLICATIONS

The present application claims priority to U.S. provisional application Ser. No. 62/425,940, filed Nov. 23, 2016, the disclosure of which is incorporated herein by reference in its entirety.

TECHNICAL FIELD

The present invention relates to a system for orchestrating multiple digital displays to display one digital content item across the multiple digital displays.

BACKGROUND OF THE INVENTION

It is desirable at times to display one digital content item in a large format. To avoid the expense and complications associated with large displays such as LCD screens or projector screens, users may choose to display the item across several smaller digital displays, so that each display shows a different portion of the content item while conveying the appearance of one cohesive image. Alternatively, users may choose to display an item across multiple displays for stylist effect.

Systems currently on the market for synchronizing and orchestrating multiple displays to show a single content item are complicated and costly. Such systems generally involve an expensive video processor that is directly connected to each display by a wired video connection. The present invention presents a system of wirelessly connected digital displays, which can quickly and easily be orchestrated to display one cohesive image using a user application connected to a cloud system, and which may be accomplished without the use of a dedicated video connection to each display.

SUMMARY OF THE INVENTION

In general, in one aspect, the invention features a system for orchestrating multiple digital display devices to display a digital content item across the multiple digital display devices, including multiple digital display devices, where each digital display device includes a display screen, a memory, a processor, and data link capabilities, a user device including a display screen, a user interface, a memory, a processor, and data link capabilities, and a cloud-based computing system configured to communicate with the multiple digital display devices and the user device, where one or more of the multiple digital display devices, the user device, and the cloud-based computing system are configured to determine a relative geometry and position of each digital display device of the multiple digital display devices, where, upon selection of the digital content item on the user device by a user, the multiple digital display devices are configured to receive data representing the digital content item and display, on the display screens of the multiple digital display devices, a synchronized display representing the digital content item, and where the synchronized display representing the digital content item is a display of the digital content item rendered across the multiple digital display devices in the form of a continuous display of the digital content item, accounting for space between multiple digital display devices and only displaying portions of the continuous display of the digital content item at locations where a digital display device is positioned.

Implementations of the invention may include one or more of the following features. The data link capabilities of the digital display device or the user device may be WiFi capabilities or wired Ethernet capabilities. The display screen of the digital display device may be an LCD screen, an LED screen, an OLED screen, a QLED screen, or a digital ink screen. The user interface may be configured to communicate with the cloud-based computing system or each digital display device to display a calibration pattern on each digital display device of the multiple digital display devices. The relative position, a spatial gap distance, or an orientation of each digital display device may be determined via the calibration pattern. The user device may further include a camera, and the camera may be configured to capture one or more images of each digital display device of the multiple digital display devices and send the one or more images to the cloud-based computing system. The cloud-based computing system may be configured to determine an identity, boundary, and orientation of each digital display device of the multiple digital display devices based on the one or more images of each digital display device of the multiple digital display devices. The data representing the digital content item may be a set of divided portions of the digital content item, and the cloud-based computing system may be configured to send respective divided portions to corresponding digital display devices. The data representing the digital content item may be an undivided portion of the digital content item, and the processor of each digital display device may be configured to crop the undivided portion of the digital content item into the portion of the continuous display of the digital content item to be displayed on the respective digital display device. The system, via the user interface, may be capable of adjusting a relative mapping of the digital content item to an outline of the multiple digital display devices in real-time. The synchronized display may be harmonized over the multiple digital display devices on the basis of resolution or color palette. The digital content item may be a static image, a video clip, a graphics animation, or application. The user device may be a smartphone, a tablet, or a mobile computing device.

In general, in another aspect, the invention features a method for orchestrating multiple digital display devices to display a digital content item across the multiple digital display devices, including determining a relative geometry and position of each digital display device of the multiple digital display devices through one or more of the multiple digital display devices, a user device, and a cloud-based computing system, selecting, by the user device, the digital content item, receiving, by the multiple digital display devices, data representing the digital content item, displaying, by display screens of the multiple digital display devices, a synchronized display representing the digital content item, where each digital display device of the multiple digital display devices includes the display screen, a memory, a processor, and data link capabilities, where the user device includes a display screen, a user interface, a memory, a processor, and data link capabilities, where the cloud-based computing system communicates with the multiple digital display devices and the user device, and where the synchronized display representing the digital content item is a display of the digital content item rendered across the multiple digital display devices in the form of a continuous display of the digital content item, accounting for space between multiple digital display devices and only displaying portions of the continuous display of the digital content item at locations where a digital display device is positioned.

Implementations of the invention may include one or more of the following features. The data link capabilities of the digital display device or the user device may be WiFi capabilities or wired Ethernet capabilities. The display screen of the digital display device may be an LCD screen, an LED screen, an OLED screen, a QLED screen, or a digital ink screen. The user interface may communicate with the cloud-based computing system or each digital display device to display a calibration pattern on each digital display device of the multiple digital display devices. The relative position, a spatial gap distance, or an orientation of each digital display device may be determined via the calibration pattern. The user device may further include a camera, and the camera may capture one or more images of each digital display device of the multiple digital display devices and send the one or more images to the cloud-based computing system. The cloud-based computing system may determine an identity, boundary, and orientation of each digital display device of the multiple digital display devices based on the one or more images of each digital display device of the multiple digital display devices. The data representing the digital content item may be a set of divided portions of the digital content item, and the cloud-based computing system may send respective divided portions to corresponding digital display devices. The data representing the digital content item may be an undivided portion of the digital content item, and the processor of each digital display device may crop the undivided portion of the digital content item into the portion of the continuous display of the digital content item to be displayed on the respective digital display device. The method may further include adjusting, by the user interface, a relative mapping of the digital content item to an outline of the multiple digital display devices in real-time. The synchronized display may be harmonized over the multiple digital display devices on the basis of resolution or color palette. The digital content item may be a static image, a video clip, a graphics animation, or application. The user device may be a smartphone, a tablet, or a mobile computing device.

DETAILED DESCRIPTION OF THE INVENTION

Figure 1:
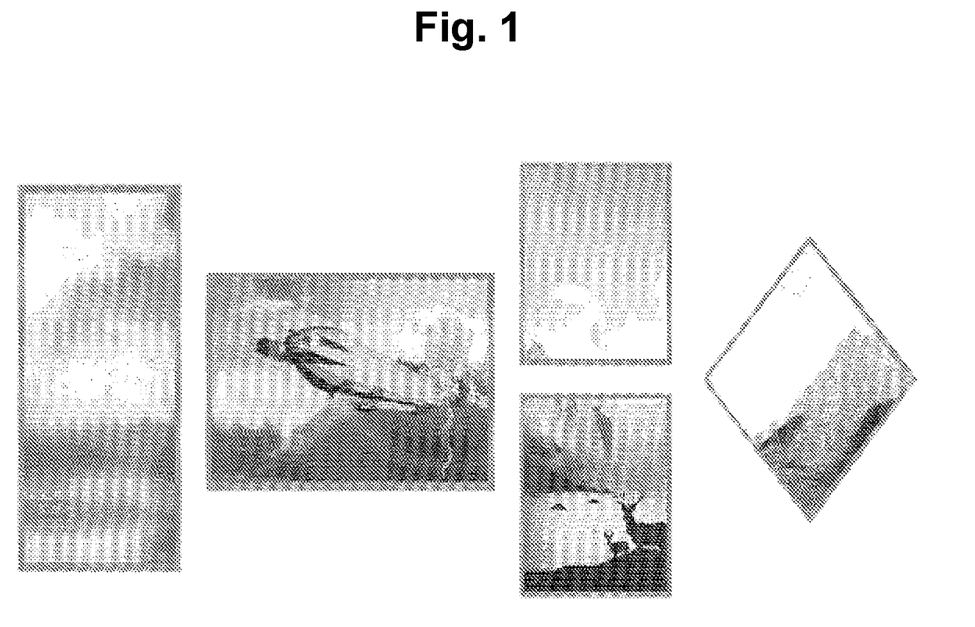
FIG. 1 shows a digital content item rendered across various digital displays as if the digital content item were displayed on one continuous surface with the image being visible only where an actual digital display is positioned.

The present invention enables a user to display one digital content item on multiple digital displays, herein referred to as Orchestrated Displays, by coordinating and synchronizing digital media content rendering and playback across the displays. Orchestrated Displays refers to the ensemble of displays that operate in a coordinated and synchronized manner. The content item may be a static image, a video clip, graphics animation, or an application ("app"). The digital displays do not need to be equally sized, adjacent, or aligned. They may have different orientations and may have spatial gaps between the digital displays. In the latter case, the digital content item is rendered across the various digital displays as if the digital content item were displayed on one continuous surface with the image being visible only where an actual digital display is positioned, as seen in FIG. 1.

Figure 2:
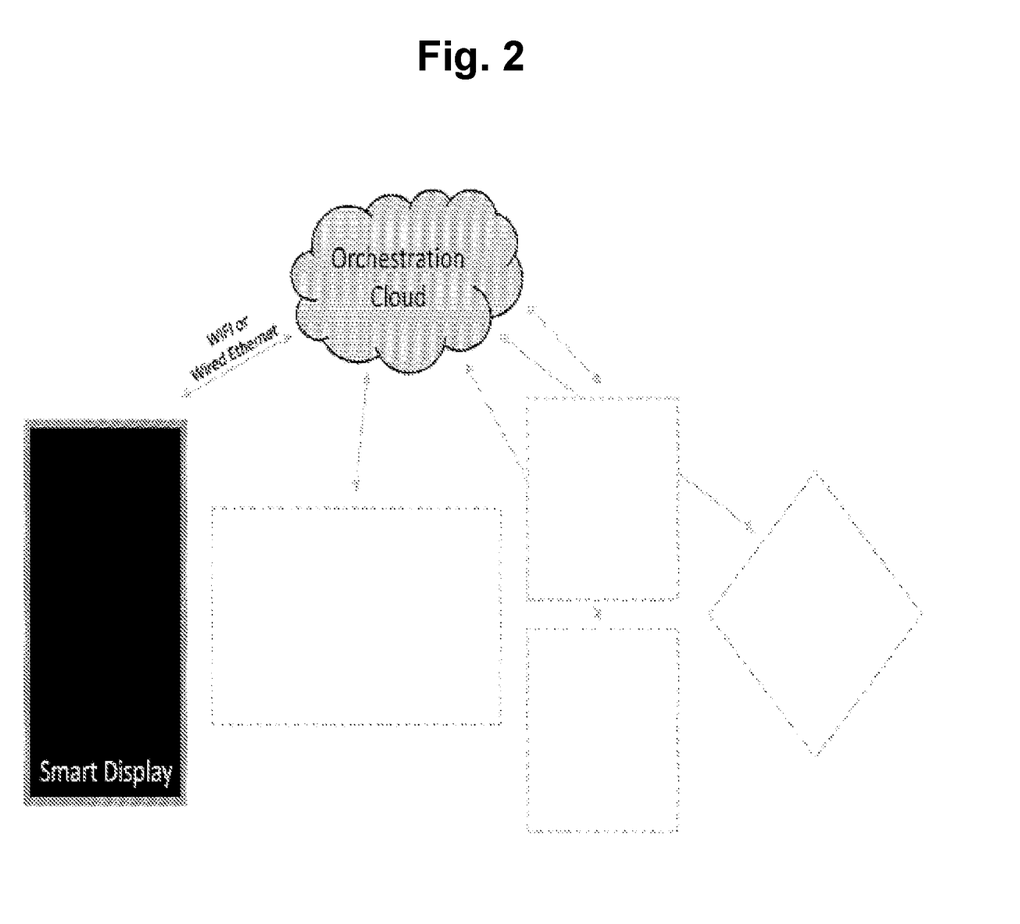
FIG. 2 shows digital displays connected to a Cloud System via the Internet.
Figure 3:
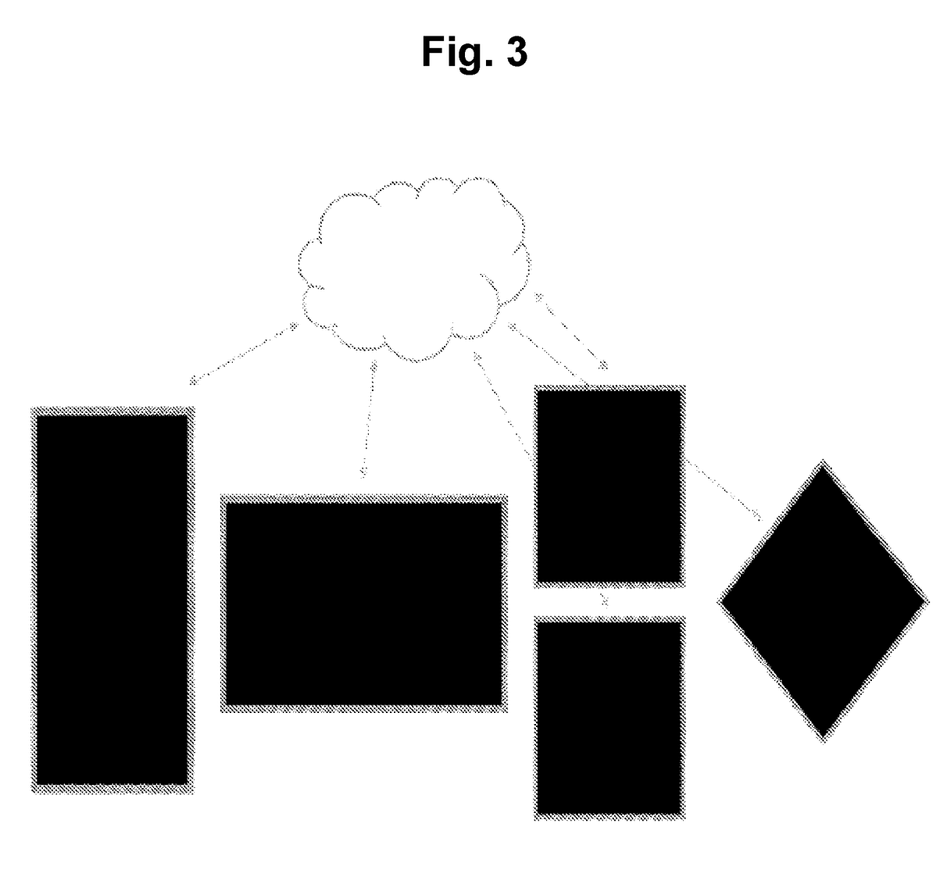
FIG. 3 shows digital displays connected to a Cloud System via the Internet.

The Orchestrated Displays are Internet-enabled, preferably by WiFi, (wired) Ethernet, or other type of data link, and include a digital display screen, i.e., an LCD, LED, OLED, QLED or digital ink screen, a memory, and a processor. As illustrated in FIGS. 2 and 3, each digital display connects to a Cloud System via the Internet before it can be used in a set of Orchestrated Displays. In this case, no other connection with the Orchestrated Displays is required.

Prior connection of the digital display ensures that the software running in each display is communicating with the Cloud System. During the display registration process, each digital display is assigned a unique identifier, such as a serial number or MAC address, and the attributes of the display, including, at a minimum, the height and width of the display's active area and pixel resolution, are recorded.

Figure 4:
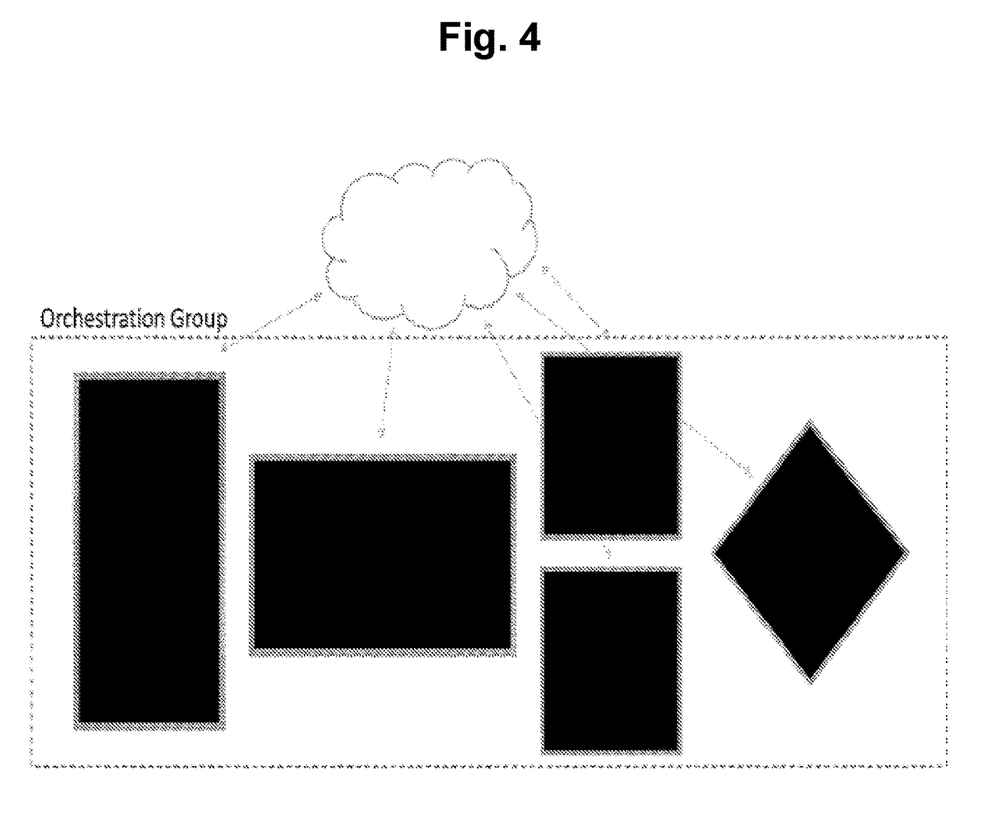
FIG. 4 shows a group of orchestrated digital displays, referred to as an Orchestration Display group.
Figure 5:
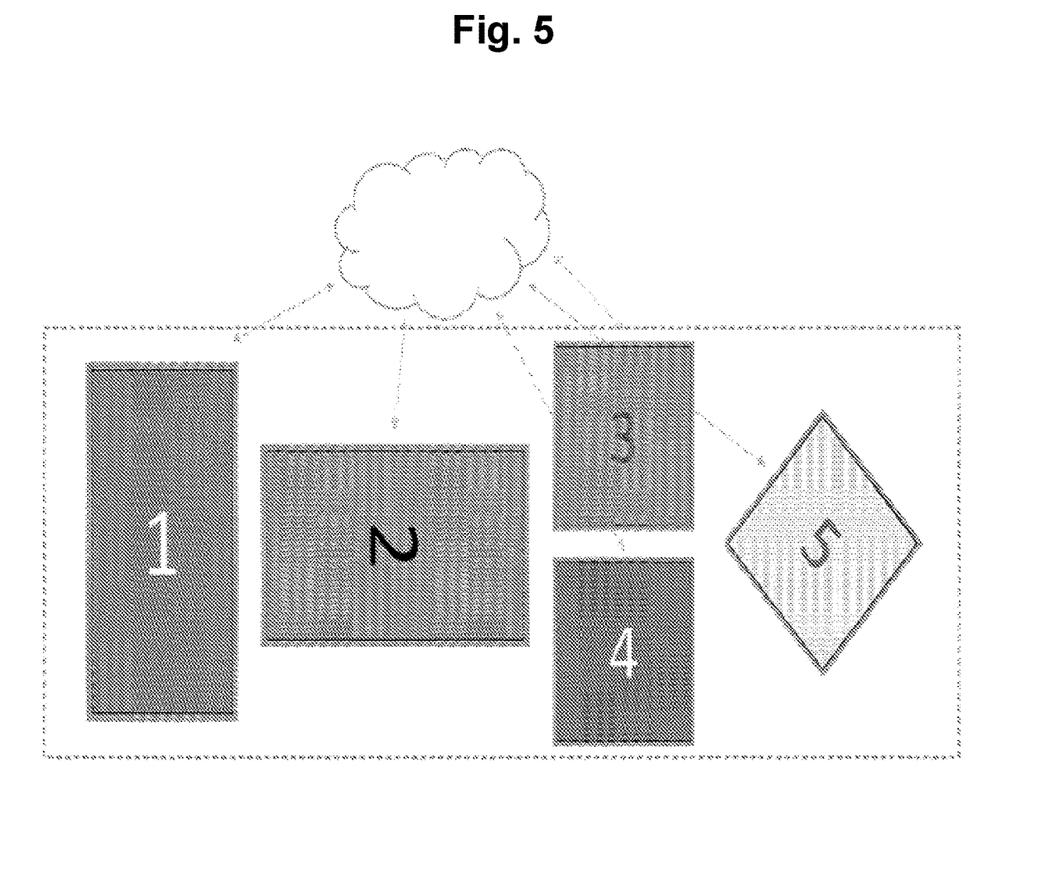
FIG. 5 shows an example of possible calibration patterns on displays in an Orchestration Display group.
Figure 6:
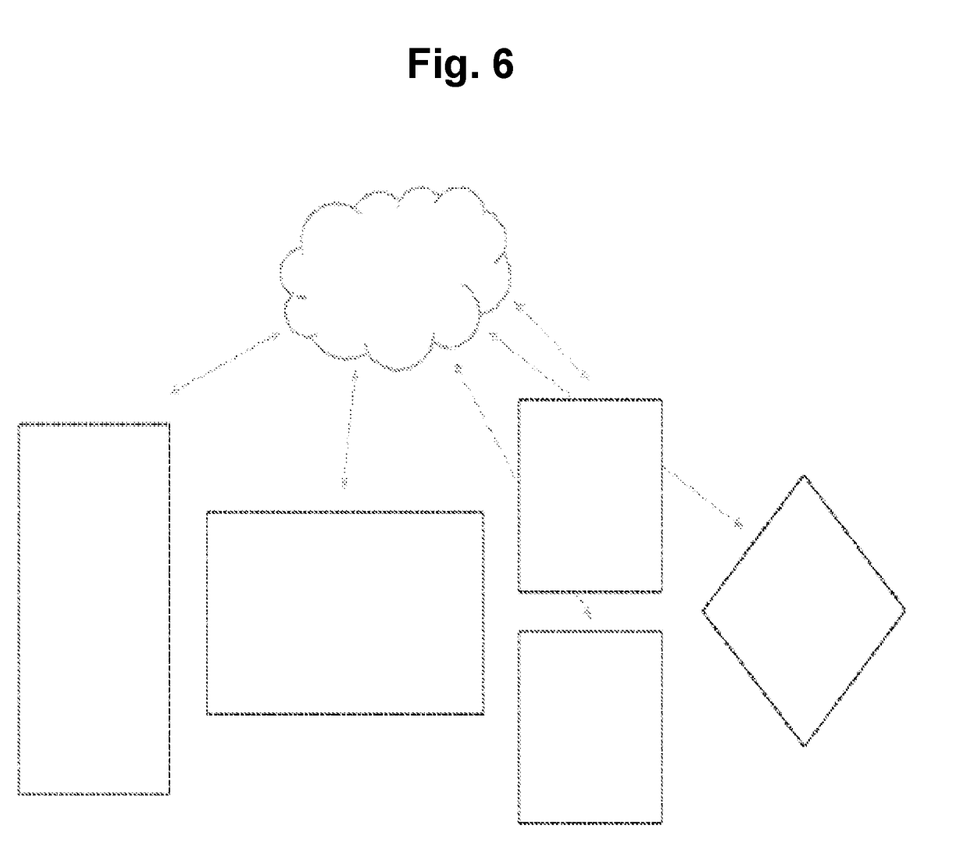
FIG. 6 shows an orchestration outline of the digital displays.

The present invention occurs in two phases, namely display mapping and content preparation and rendering. The purpose of display mapping is to define the specific size, relative location, and orientation of each of the Orchestrated Displays to determine which part of each image is displayed on each digital display. To begin the display mapping phase, the Cloud System interacts with a user via an interface on a user device to create an Orchestration Group and to assign registered digital displays to that group, as seen in FIG. 4. To determine the attributes of each digital display, the user interface, in communication with the Cloud System or each digital display, displays a calibration pattern on each display that is part of the Orchestrated Display group. The calibration pattern is unique to each digital display and includes a graphics image with a unique identifier. The graphics image fills the active digital display and provides display reference points. The unique visual identifier can range from a simple number to patterns and complex images embedding encoded information. An exemplary calibration is shown in FIG. 5.

In a preferred embodiment, a user device, such as a smart phone having a processor and a camera, is connected to the Cloud System and used to take a picture of the group of digital displays i.e., the Orchestration Group, to capture their relative geometry, positions, and other attributes. The image from the smart phone is uploaded to the Cloud System, where it is analyzed to determine the identity, boundaries, and orientation of each digital display device. Other measurements may not be required. The display attributes of each digital display are compared to the information extracted from the image to determine the precise relative geometry of the various display surfaces in an arbitrary reference system. These attributes are called Orchestration Attributes. Orientation of each digital display may be determined using the orientation sensor built into the displays or by analyzing the relative orientation of the calibration patterns as discussed above, as shown in FIG. 5.

Figure 7:
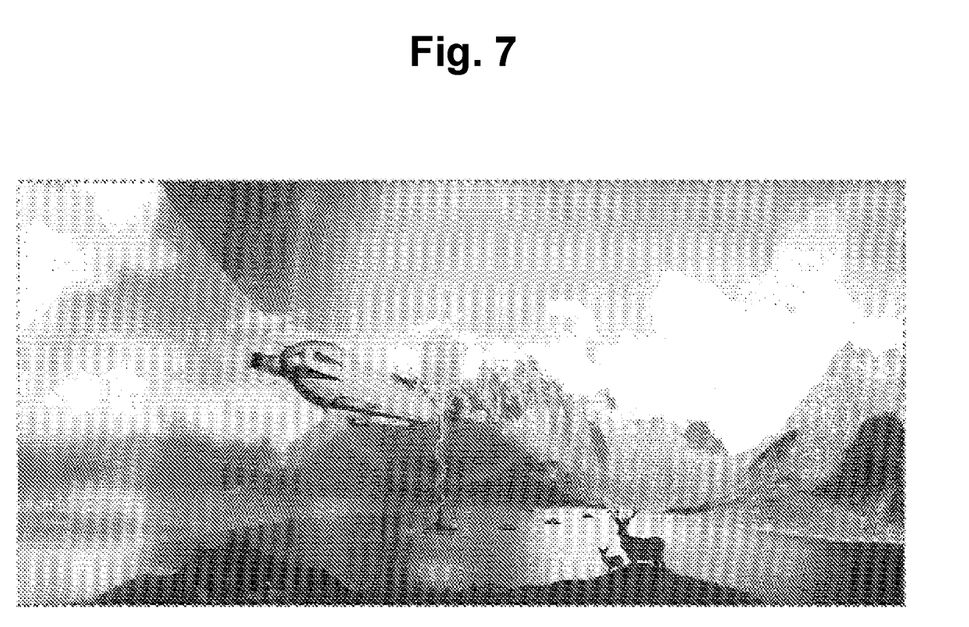
FIG. 7 shows an exemplary digital content item.
Figure 8:
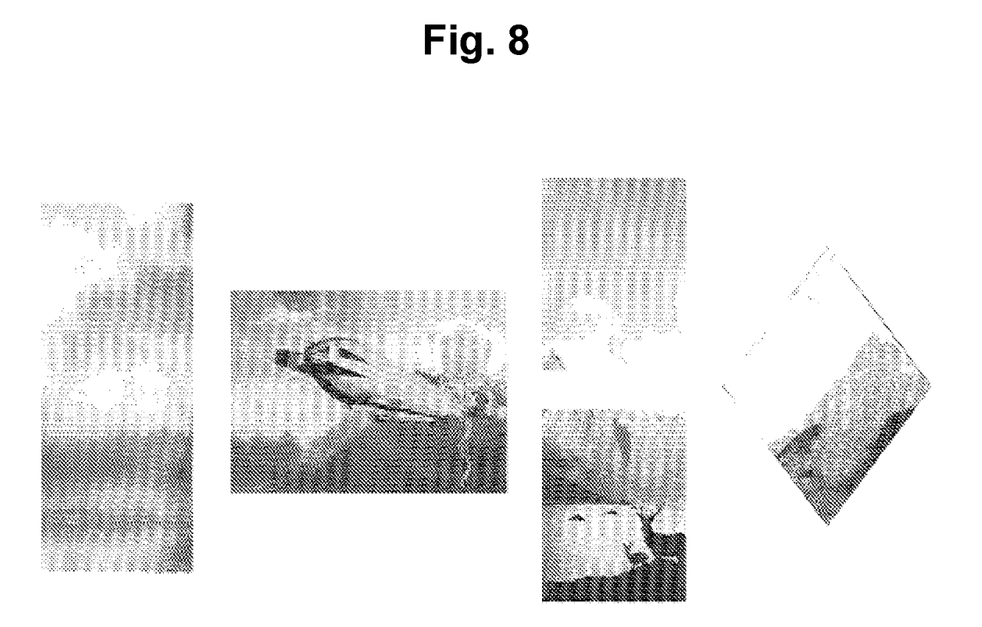
FIG. 8 shows specific parts of the digital content item seen in FIG. 7 to be arranged across various displays shown in FIG. 6.
Figure 9:
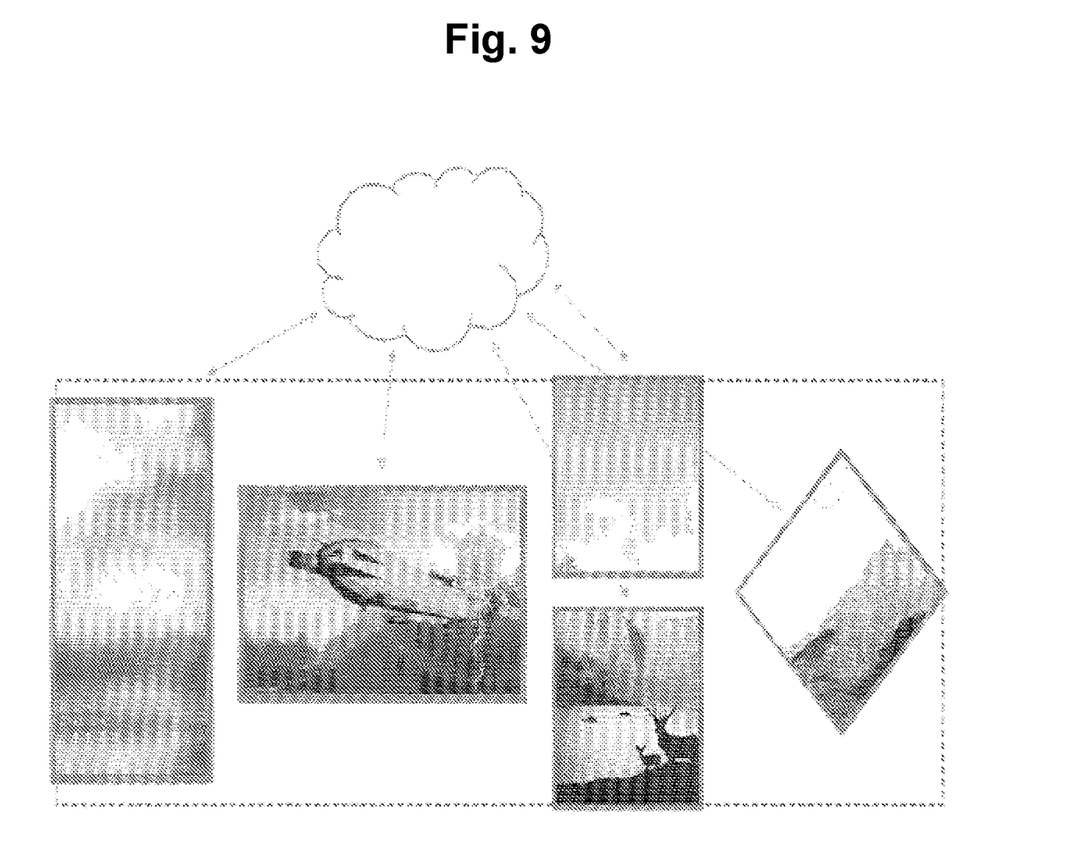
FIG. 9 shows each digital display of multiple digital displays receiving information over a network.

The content preparation and render phase begins with a user selecting a digital content item, such as the image seen in FIG. 7, to be displayed. A user interface located on a mobile device or any computing user device connected to the Cloud System allows a user to select a digital content item and assign it to the Orchestrated Display group to be displayed in real-time or at a later time. The user interface may display an outline of the orchestration group as an overlay on top of the digital content item and permit the user to pan and/or enlarge the digital content item to determine a specific fit with the various Orchestrated Displays. The relative changes to the digital content item may or may not be reflected in real-time on the Orchestrated Displays. In one implementation, the Orchestration Attributes stored in the Cloud System are used to pre-process the digital content item and create a separate file for each digital display that is part of the Orchestrated Display group, where the separate files incorporate the specific parts of the content item that will be displayed on the specific displays. The specific content of each file is determined in order to harmonize the display of the digital content item across all of the Orchestrated Displays, considering their respective size, relative distance, orientation, and resolution, as well as other attributes, such as color palette. The specific portions of the digital content item to be displayed are shown in FIG. 8. Time synchronization information may be also added to each file to ensure strict playback synchronization in the case of video, animation, or app media. The files are downloaded to the Orchestrated Displays over wired, WiFi, or other data link connections and stored in each display. Upon receiving a command to play the orchestrated content, each Orchestrated Display starts playing its respective media file synchronously with the other digital displays that are part of the Orchestrated Display group. Synchronization is ensured using precise timing information distributed in real-time over the network. Each digital display receives this timing information over the network and precisely synchronizes image playback frame accurately, as illustrated in FIG. 9.

In another implementation, Orchestrated Attributes are downloaded to each digital display to make the display "aware" of its relative position and orientation within the Orchestrated Display group. Time synchronization information is added to the digital content item before it is downloaded and stored in all digital displays that are part of the Orchestrated Display group, meaning that the same file containing the complete digital content item is downloaded to each display. The processor embedded in each digital display uses the attributes to extract the portion of the digital content item that will be displayed on its specific display surface by cropping the content item to the display size and location, rotating images to align with surface orientation of the digital display, and adjusting the digital content item to harmonize display resolution, color palette, and other pertinent visual attributes. Time synchronization is preserved during the processing. Cropping and rotation of the digital content item occurs either in real-time during playback or upon receiving the original content file, in which case the extracted portion of the content item is stored locally to be used for synchronized playback when needed. During playback, synchronization is ensured using precise timing information distributed in real-time over the network. Each digital display receives this timing information over the network and precisely synchronizes image playback frames accurately.

It will be understood by those of ordinary skill in the art that various changes may be made and equivalents may be substituted for elements without departing from the scope of the invention. In addition, many modifications may be made to adapt a particular feature or material to the teachings of the invention without departing from the scope thereof. Therefore, it is intended that the invention not be limited to the particular embodiments disclosed, but that the invention will include all embodiments falling within the scope of the claims.

What is claimed is:

1. A system for orchestrating multiple digital display devices to display a digital content item across the multiple digital display devices, comprising:
   multiple digital display devices, wherein each digital display device includes a display screen, a memory, a processor, and data link capabilities;
   a user device including a display screen, a user interface, a memory, a processor, and data link capabilities; and
   a cloud-based computing system configured to communicate with the multiple digital display devices and the user device;
   wherein one or more of the multiple digital display devices, the user device, and the cloud-based computing system are configured to determine a relative geometry and position of each digital display device of the multiple digital display devices;
   wherein, upon selection of the digital content item on the user device by a user, the multiple digital display devices are configured to receive data representing the digital content item and display, on the display screens of the multiple digital display devices, a synchronized display representing the digital content item; and
   wherein the synchronized display representing the digital content item is a display of the digital content item rendered across the multiple digital display devices in the form of a continuous and incomplete display of the digital content item, the display of the digital content item being incomplete as a result of accounting for space between the display screens of the multiple digital display devices and only displaying portions of the display of the digital content item corresponding to locations where a display screen of a digital display device is positioned.

2. The system of claim 1, wherein the data link capabilities of the digital display device or the user device are WiFi capabilities or wired Ethernet capabilities.

3. The system of claim 1, wherein the display screen of the digital display device is an LCD screen, an LED screen, an OLED screen, a QLED screen, or a digital ink screen.

4. The system of claim 1, wherein the user interface is configured to communicate with the cloud-based computing system or each digital display device to display a calibration pattern on each digital display device of the multiple digital display devices.

5. The system of claim 4, wherein the relative position, a spatial gap distance, or an orientation of each digital display device is determined via the calibration pattern.

6. The system of claim 1, wherein the user device further includes a camera, and wherein the camera is configured to capture one or more images of each digital display device of the multiple digital display devices and send the one or more images to the cloud-based computing system.

7. The system of claim 6, wherein the cloud-based computing system is configured to determine an identity, boundary, and orientation of each digital display device of the multiple digital display devices based on the one or more images of each digital display device of the multiple digital display devices.

8. The system of claim 1, wherein the data representing the digital content item is a set of divided portions of the digital content item, and wherein the cloud-based computing system is configured to send respective divided portions to corresponding digital display devices.

9. The system of claim 1, wherein the data representing the digital content item is an undivided portion of the digital content item, and wherein the processor of each digital display device is configured to crop the undivided portion of the digital content item into the portion of the display of the digital content item to be displayed on the respective digital display device.

10. The system of claim 1, wherein the system, via the user interface, is capable of adjusting a relative mapping of the digital content item to an outline of the multiple digital display devices in real-time.

11. The system of claim 1, wherein the synchronized display is harmonized over the multiple digital display devices on the basis of resolution or color palette.

12. The system of claim 1, wherein the digital content item is a static image, a video clip, a graphics animation, or application.

13. The system of claim 1, wherein the user device is a smartphone, a tablet, or a mobile computing device.

14. A method for orchestrating multiple digital display devices to display a digital content item across the multiple digital display devices, comprising:
  determining a relative geometry and position of each digital display device of the multiple digital display devices through one or more of the multiple digital display devices, a user device, and a cloud-based computing system;
  selecting, by the user device, the digital content item;
  receiving, by the multiple digital display devices, data representing the digital content item;
  displaying, by display screens of the multiple digital display devices, a synchronized display representing the digital content item;
  wherein each digital display device of the multiple digital display devices includes the display screen, a memory, a processor, and data link capabilities;
  wherein the user device includes a display screen, a user interface, a memory, a processor, and data link capabilities;
  wherein the cloud-based computing system communicates with the multiple digital display devices and the user device; and
  wherein the synchronized display representing the digital content item is a display of the digital content item rendered across the multiple digital display devices in the form of a continuous and incomplete display of the digital content item, the display of the digital content item being incomplete as a result of accounting for space between the display screens of the multiple digital display devices and only displaying portions of the display of the digital content item corresponding to locations where a display screen of a digital display device is positioned.

15. The method of claim 14, wherein the data link capabilities of the digital display device or the user device are WiFi capabilities or wired Ethernet capabilities.

16. The method of claim 14, wherein the display screen of the digital display device is an LCD screen, an LED screen, an OLED screen, a QLED screen, or a digital ink screen.

17. The method of claim 14, wherein the user interface communicates with the cloud-based computing system or each digital display device to display a calibration pattern on each digital display device of the multiple digital display devices.

18. The method of claim 17, wherein the relative position, a spatial gap distance, or an orientation of each digital display device is determined via the calibration pattern.

19. The method of claim 14, wherein the user device further includes a camera, and wherein the camera captures one or more images of each digital display device of the multiple digital display devices and sends the one or more images to the cloud-based computing system.

20. The method of claim 19, wherein the cloud-based computing system determines an identity, boundary, and orientation of each digital display device of the multiple digital display devices based on the one or more images of each digital display device of the multiple digital display devices.

21. The method of claim 14, wherein the data representing the digital content item is a set of divided portions of the digital content item, and wherein the cloud-based computing system sends respective divided portions to corresponding digital display devices.

22. The method of claim 14, wherein the data representing the digital content item is an undivided portion of the digital content item, and wherein the processor of each digital display device crops the undivided portion of the digital content item into the portion of the display of the digital content item to be displayed on the respective digital display device.

23. The method of claim 14, further comprising adjusting, by the user interface, a relative mapping of the digital content item to an outline of the multiple digital display devices in real-time.

24. The method of claim 14, wherein the synchronized display is harmonized over the multiple digital display devices on the basis of resolution or color palette.

25. The method of claim 14, wherein the digital content item is a static image, a video clip, a graphics animation, or application.

26. The method of claim 14, wherein the user device is a smartphone, a tablet, or a mobile computing device.

* * * * *